March 4, 1958 J. BAUDER ET AL 2,825,440
DRIVE CONTROL FOR TYPE-BARS OF TELEPRINTER MACHINES OR THE LIKE
Filed Feb. 11, 1955 3 Sheets-Sheet 1
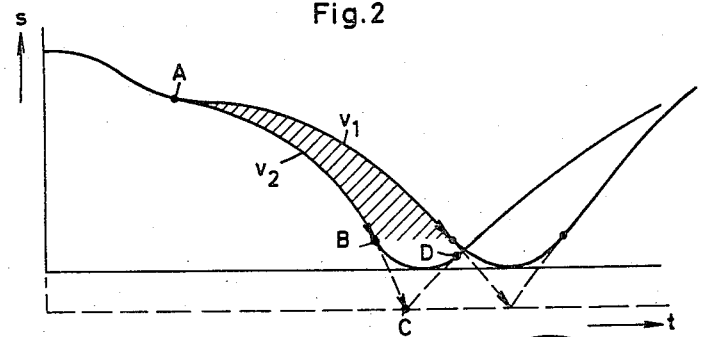
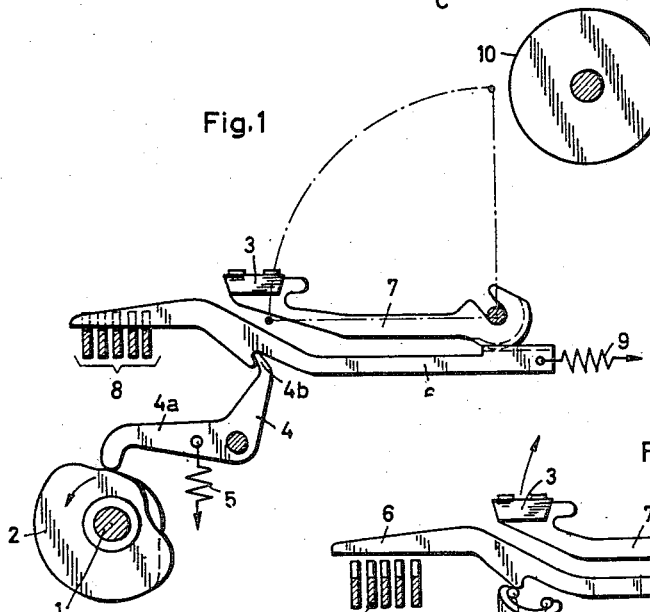
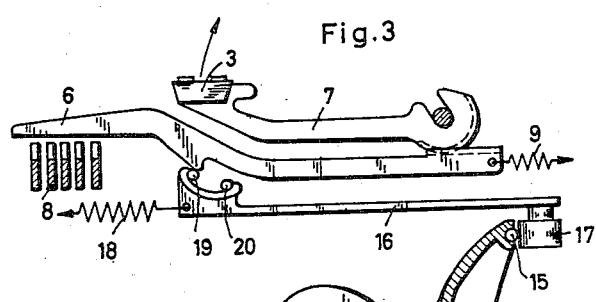
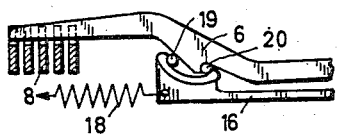
Inventors.
Josef Bauder,
Walter Bohne, &
Robert Stabenau.
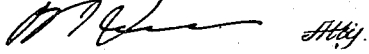
By Atty.

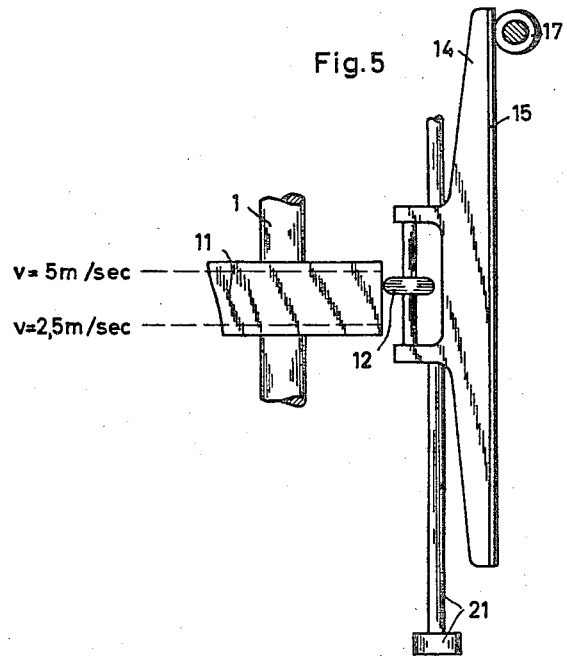
Fig. 5
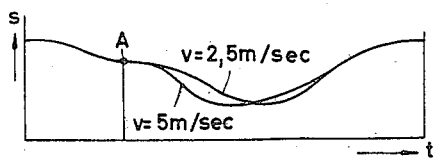
Fig. 6
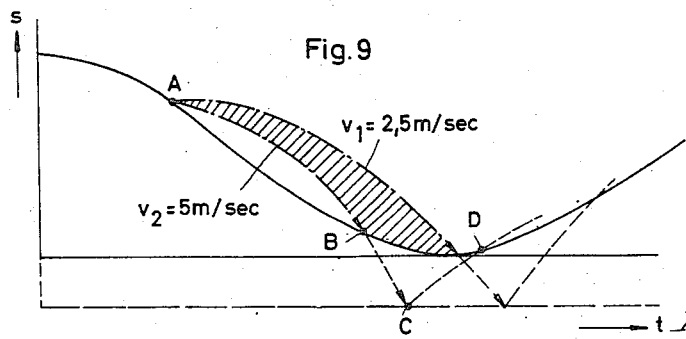
Fig. 9

March 4, 1958 J. BAUDER ET AL 2,825,440
DRIVE CONTROL FOR TYPE-BARS OF TELEPRINTER MACHINES OR THE LIKE
Filed Feb. 11, 1955 3 Sheets-Sheet 3

Inventors.
Josef Bauder,
Walter Bohne, &
Robert Stabenau.
By Atty.

United States Patent Office 2,825,440
Patented Mar. 4, 1958

2,825,440

DRIVE CONTROL FOR TYPE-BARS OF TELEPRINTER MACHINES OR THE LIKE

Josef Bauder, Munich-Solln, and Walter Bohne and Robert Stabenau, Munich, Germany, assignors to Siemens & Halske Aktiengesellschaft, Munich and Berlin, Germany, a German corporation Application February 11, 1955, Serial No. 487,635

Claims priority, application Germany February 18, 1954

8 Claims. (Cl. 197—17)

This invention relates to typewriters, especially of the teleprinter type, and is particularly concerned with a drive control for the type-bars of such machines, which are moved by a common cam-operated spring-biased actuating member through the medium of spring controlled pull rods.

It is known to actuate type-bars of this kind by a spring and to determine by means of a cam carried by a motor-driven shaft the instant when a selected type-bar has to be actuated, as well as to control the acceleration of such a bar during its initial motion in the direction of the record carrier and to tension the actuating springs in the interval between two typing operations. In order to regulate the impact velocity of the type-bar relative to the record carrier, prior drives of the indicated kind permit the spring-biased actuating member or an intermediate element coupled therewith and normally in engagement with the cam to disengage from such cam at the instant of reaching a cam valley. The actuating member subsequently again engages the cam with an impact. On the other hand, the pull rod which is coupled with the type-bar disengages from the actuating member and the type-bar hurls freely against the record carrier. The impact force of the type-bar is easily adjustable by altering the tension of the actuating spring, but such adjustment depends solely on the operator and can be carried out only by experimentation.

The printing or type operation effected by such drives puts great stresses upon the involved parts and produces loud impact noises.

The invention avoids the above indicated disadvantages by forming the control cam in such a manner and by tensioning the springs which bias the actuating member and the pull rod at any time controlled thereby so that the actuating member is always in engagement with the cam. The selected pull rod is in known manner freed from the actuating member upon reaching the end of its actuating motion.

In accordance with another feature of the invention, the drive may contain a plurality of selectively operable control cams of different configuration for the purpose of selectively adjusting the terminal velocity of the type-bars.

A continuous regulation of the type-bar velocity is in accordance with a further object and feature of the invention possible by providing for a relative axial displacement between the control cam and the actuating member or the control cam and an intermediate scanning or control element therefor so as to obtain between the control cam and the actuating member different terminal velocities of the type-bar.

In accordance with still another object and feature of the invention, in the case of page typewriters, especially page teleprinter machines with movable type-bar basket assembly, there may be provided between the cam and the actuating member an intermediate element having a control edge facing the record carrier and having a length corresponding at least to that of a line. The intermediate element may in such a case be in the form of a rocking member, arranged between the cam and the actuating member and may be adjustable parallel to the cam by means of a manually operable adjusting member; its control edge which faces the actuating member must in such case be longer than a line at least by the amount allowed for the adjustment.

The foregoing and other objects and features will be brought out in the description which will presently be rendered with reference to the accompanying diagrammatic drawings. In these drawings, Fig. 1 is a view showing an embodiment of a type-bar drive for a teleprinter machine illustrating the principle of operation;

Fig. 2 represents the way-time diagram of the motion of the actuating member and the type-bar of the arrangement shown in Fig. 1;

Fig. 3 shows the side view of another embodiment of a type-bar drive;

Fig. 4 is a fractional view of parts of Fig. 3 with the pull rod in terminal position;

Fig. 5 illustrates parts of Fig. 3 in elevation;

Fig. 6 represents a way-time diagram of the motion of the actuating member and type-bar of the embodiment shown in Figs. 3 to 5;

Fig. 9 represents a way-time diagram of the motion of corresponding parts as employed in a known arrangement.

Figure 7:
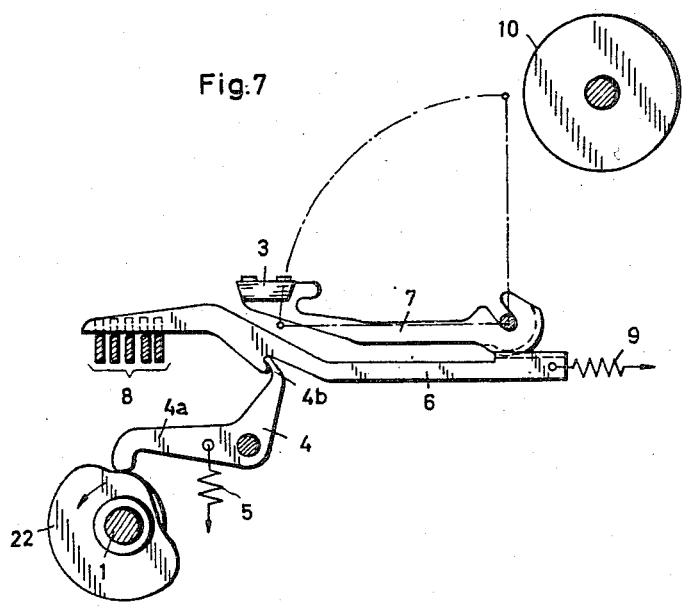
Fig. 7 shows a further embodiment of a type-bar drive.

The type-bar drive according to Fig. 1 is provided for a teleprinter machine with selectively adjustable type-bar velocities. The drive comprises a shaft 1 carrying a relatively wide cam 2 having a control flank extending in part cylindrical and in part along a predetermined curve. The cam is axially movable by means omitted in the drawing. A strong spring 5 keeps the scanning lever arm 4a of an actuating member 4 always in engagement with the cam 2. The angularly extending end 4b of the other arm of the actuating member 4 is disposed underneath all of the pull rods 6 of the type-bars 7. The drawing shows only one of the 28 pull rods which engages the receiver selection members 8 and the type-bar 7 coupled therewith. Both are held in normal position by the pull of a spring 9.

The shaft 1 is shown in a position after it has left its initial position; the actuating member is in a position in which it begins to engage the pull rod 6. This position corresponds in the time-way diagram of Fig. 2 to the point A of the impact edge of the actuating member. During the further rotation of the shaft, the actuating member 4, the pull rod 6 and the type bar 7 are similarly accelerated. The impact edge finally reaches the point B of the diagram Fig. 2. Its velocity decreases from this point on. The pull rod 6 now separates from the impact edge of the actuating member and continues to travel further with the type-bar until the head 3 of the latter hits the record on the carrier 10. In the diagram Fig. 2, this motion corresponds to the dotted portion B—C. The motions of the pull rod and the type bar are now reversed. On the return path, the pull rod catches up with the actuating member at the point D of Fig. 2. Both parts now have the same velocity and no impact therefore takes place. The actuating member 4 is maintained in engagement with the cam 2 during its greatest acceleration. The cam 2 is dimensioned so as to obtain a terminal velocity, for example, of about 5 m./sec. The spring 5 can expend its stored energy only in accordance with the motion of the lever arm 4a along the cam 2.

If a lesser terminal velocity of the type-bar is sufficient, the cam 2 is axially shifted. The motion of the impact edge of the actuating member now follows the curve $v_1$ instead of the curve $v_2$ in Fig. 2. The general operation is as described before.

In the arrangement according to Figs. 3 to 5, the shaft 1 of a page teleprinter machine is again provided with a relatively wide cam 11 having a control flank extending partly cylindrical and partly along a curve as before. The cam is again by suitable not illustrated known means axially adjustable. A roller 12 engages the cam, the roller being journalled in an intermediate member 14 pivoted for rocking about the axis 13. The free end of this intermediate rocking member is provided with a steel wire 15 serving as a control edge for the actuating member 16. The coupling between the steel wire 15 and the actuating member 16 is accomplished over a roller 17 which is rotatably journalled on the actuating member. A spring 18 connected with the actuating member keeps the parts 11, 14 and 16 in mutual engagement. Similarly as in Fig. 1, the actuating member 16 extends underneath all pull rods 6. For simplicity of representation only one of these pull rods and only one type-bar 7 coupled therewith have been shown. Numeral 9 designates the spring associated with the pull rod.

Fig. 3 shows the normal position of the parts of the arrangement in which all pull rods 6 are lifted out of the selection bars 8 by a slide wire 19 carried by the actuating member 16. As soon as the further wire 20 on the actuating member, which acts as an impact edge, reaches the point A in the way-time diagram, the pull rods 6 and the actuating members 16 will assume the positions in which they are shown in Fig. 4. The further operation of the individual parts corresponds to that described in connection with Fig. 1.

The terminal velocity of the type-bar can now be adjusted in continuous manner. It is for this purpose merely necessary to shift the intermediate actuating or control member 14 axially of the shaft 1 by means of the adjusting gear 21. When the roller 12 of the intermediate member 14 engages the cam 11 in either one of the dotted terminal positions indicated in Fig. 5, the actuating member will describe the respectively corresponding paths shown in full lines in Fig. 2; with the roller 12 in intermediate positions, it will describe paths lying between the corresponding curves. The terminal velocity of the type head is in this manner continuously variable between 2.5 m./sec. and 5 m./sec.

The arrangement is intended for a page teleprinter machine, and the length of the wire 15 acting as a control edge therefor must correspond at least to the length of the line on the page plus the amount of axial adjustment of the roller 12 relative to the cam 11.

The type-bar drive according to Fig. 7, for a teleprinter machine with selectively adjustable type-bar velocities, also comprises a shaft 1 carrying a relatively wide cam 22 having a control flank forming a cylindrical and a curved surface. This cam is again axially adjustable by suitable not illustrated known means. A strong spring 5 keeps the lever arm 4a of an actuating member 4 always in engagement with a cam 2. An impact edge 4b of the actuating member extends underneath all pull rods 6 of the type-bars 7. Only one of the 28 pull rods and only one type-bar 7 coupled therewith have been shown for simplicity of representation. Both are held in normal position by a spring 9.

Figure 8:
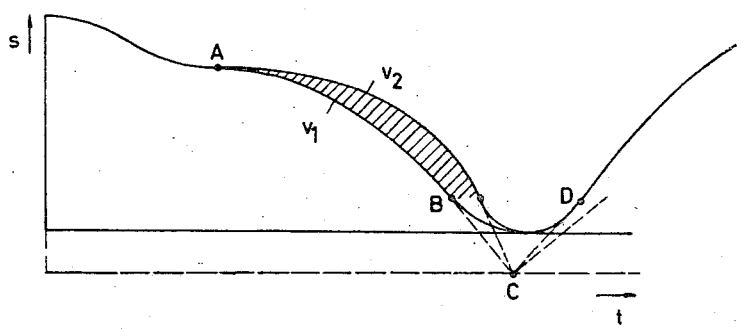
Fig. 8 illustrates a way-time diagram of the motion of the actuating member and type-bar of the structure shown in Fig. 7.

The cam 22 is shown in a position which it has assumed after leaving its initial normal position. The impact edge of the actuating member begins to engage the pull rod 6. This position of the impact edge corresponds in the time-way diagram Fig. 8 to the point A which is purposely placed in a low velocity range in order to avoid chattering and lifting of the actuating member relative to the cam. The actuating member 4, the pull rod 6 and the type-bar 7 are similarly accelerated during the further rotation of the shaft and the cam. The impact edge finally reaches the point B in the time-way diagram Fig. 8. From this point on the velocity will again be reduced. The pull rod 6 now leaves the impact edge of the actuating member and hurls together with the type-bar toward the record carrier until the type head 3 hits the record. This motion corresponds to the dotted path B—C of the diagram Fig. 8. The pull rod and the type-bar thereupon move in reverse direction. During the return motion, the pull rod catches up with the actuating member at the point D, if the parts have been set to highest velocity; at low velocities, such catching up of the pull rod relative to the impact edge of the actuating member does not occur. Both parts have at the point D identical velocities and there is accordingly no impact. The engagement between the actuating member and the cam is maintained even with greatest acceleration of the parts. The cam 22 is formed and dimensioned so as to provide for a maximal terminal acceleration, for example, of about 5 m./sec. The spring 5 can expend its stored energy only in accordance with the motion of the lever arm 4a along the cam superficies.

In case a lower terminal velocity will suffice for the type-bars, the cam 22 will be axially shifted. The motion of the impact edge of the actuating member will thereafter extend in accordance with curve $v_1$ instead of in accordance with the curve $v_2$ of the diagram Fig. 8. The operations are generally similar as already described. Care is however taken to keep the time of the typing point substantially identical.

It is accordingly unnecessary to make provisions for a possible time shift of this point incident to the usual lifting and lowering of the ink ribbon shortly before the typing instant is reached and after the typing, respectively. However, the avoidance of substantial time fluctuations of the typing operations results above all in the possibility of utilizing large portions of the time interval of an impulse series for other desired purposes.

Fig. 9 shows for comparison with Fig. 2, a corresponding diagram for a machine provided with a type-bar drive of the initially mentioned known kind in which a spring-biased actuating member or an intermediate control member coupled therewith leaves the control cam suddenly at the point A, when it reaches a cam valley, subsequently again hitting the cam at the point B. The curve shown in full line thereby corresponds to the radial shifting of the point on the cam at which the actuating member is in engagement therewith or at which it would be in engagement with the cam if it could always follow it, the curve portions shown in dot-dash lines corresponding to the true motions of the actuating member, the selected pull rod and the associated type-bar, and the dotted lines indicating the remaining impact motions of the pull rod and the type-bar for the previously mentioned terminal velocities $v=2.5$ m/sec. and $v=5$ m./sec., respectively.

Modifications are possible. For example, instead of providing for a dynamic type-bar operation, the selector type bars may in controlled manner be additionally pressed against the record. The required force may be adjustable on a scale which may be calibrated, for example, in accordance with the number of carbon copies that may be desired. Instead of one cam such as respectively shown at 2, 11 and 22, two or more differently shaped cams may be used and arranged side by side. In such a case, the transition from one to another cam may, of course, be carried out only in the normal position thereof.

Changes may be made within the scope and spirit of the appended claims.

We claim:

1. In a teleprinter machine or the like having type-bars which are responsive to operation of a common cam controlled spring-biased actuating member and operated by spring-biased pull rods respectively associated therewith, a drive for said type bars comprising a plurality of common selectively operable control cam means of different configuration for selectively adjusting the terminal velocity of said type-bars, a common actuating member governed by said cam means, a pull rod for each type-bar operable by said actuating member, spring means for respectively biasing said actuating member and said pull rod, and means for selecting a pull rod for actuation to operate the type-bar associated therewith responsive to operation of said actuating member by said cam means and consequent displacement of said selected pull rod to an operated position thereof, the configuration of each of said cam means being such as to drive said actuating member with respectively different velocity in accordance with a predetermined curve, said actuated pull rod disengaging said actuating member after passing in its travel through a substantially identical distance regardless of the velocity imparted thereto.

2. A structure and cooperation of parts as defined in claim 1, comprising a cam having sections of different curve configuration, said sections constituting said selectively operable control cam means, said cam sections being axially adjustable relative to said actuating member for selective coaction therewith to determine correspondingly different terminal velocities for said type-bars.

3. A structure and cooperation of parts as defined in claim 1, comprising a cam having sections of different curve configuration, said sections constituting said selectively operable control cam means, an intermediate control member for coaction with said cam means, said intermediate control member driving said actuating member, and means for axially adjusting said intermediate control member relative to said cam sections for selective coaction therewith to determine respectively different terminal velocities for said type-bars.

4. A structure and cooperation of parts as defined in claim 1, wherein said type-bars are assembled in a type-bar basket which is movable relative to a record carrier, comprising an intermediate control member disposed between said actuating member and said cam means, said intermediate control member carrying a control edge for coaction with said actuating member, said control edge facing said record carrier and its length corresponding at least to the length of a line to be recorded.

5. A structure and cooperation of parts as defined in claim 1, wherein said type-bars are assembled in a type-bar basket which is movable relative to a record carrier, comprising an intermediate control member disposed between said actuating member and said cam means, said intermediate control member carrying a control edge for coaction with said actuating member, said control edge facing said record carrier and its length corresponding at least to the length of a line to be recorded, means for pivotally mounting said intermediate control member, and means for adjusting said control member in a direction extending in parallel with the axis of said cam means, said control edge being longer than the length of a line by an amount corresponding to the displacement thereof in parallel with the axis of said cam means.

6. A structure and cooperation of parts as defined in claim 1, wherein the curve configuration of said control cam means is such that the selectively effected velocity curves corresponding thereto meet in a way-time diagram for the type of any type-bar substantially at an identical typing point.

7. A structure and cooperation of parts as defined in claim 1, comprising a cam having sections of different curve configuration, said sections constituting said selectively operable control cam means, said cam sections being axially adjustable relative to said actuating member for selective coaction therewith to determine correspondingly different terminal velocities for said type-bars, the curve configuration of said cam sections being such that the selectively effected velocity curves corresponding thereto meet in a way-time diagram for the type of any type-bar substantially at an identical typing point.

8. A structure and cooperation of parts as defined in claim 1, wherein the tension of said spring means which respectively biases said pull rod engaged by said actuating member and such actuating member is such as to maintain said actuating member always in engagement with said control cam means.

References Cited in the file of this patent
UNITED STATES PATENTS 1,665,594     Krum  ------------------ Apr. 10, 1928
1,904,164     Morton et al. ----------- Apr. 18, 1933